(12) United States Patent
Kanazawa

(10) Patent No.: US 6,168,277 B1
(45) Date of Patent: Jan. 2, 2001

(54) REARVIEW MIRROR

(75) Inventor: Toru Kanazawa, Shizuoka (JP)

(73) Assignee: Murakami Corporation(JP)

(*) Notice: Under 35 U.S.C. 154(b), the term of this patent shall be extended for 0 days.

(21) Appl. No.: 09/546,517

(22) Filed: Apr. 11, 2000

(30) Foreign Application Priority Data

Jul. 12, 1999 (JP) .................................................. 11-197771

(51) Int. Cl.7 .............................. G02B 5/08; G02B 7/182
(52) U.S. Cl. ......................... 359/606; 359/603; 359/604; 359/875
(58) Field of Search ................................... 359/601–614, 359/871–880

(56) References Cited

U.S. PATENT DOCUMENTS

| | | | |
|---|---|---|---|
| 2,691,919 | * 10/1954 | Springer | 359/605 |
| 3,870,404 | * 3/1975 | Wilson et al. | 359/606 |
| 4,826,289 | * 5/1989 | Vandenbrink et al. | 359/601 |
| 4,836,648 | * 6/1989 | Niwayama | 359/606 |
| 5,521,760 | * 5/1996 | De Young et al. | 359/601 |

\* cited by examiner

*Primary Examiner*—Thong Nguyen
(74) *Attorney, Agent, or Firm*—Hedman, Gibson & Costigan, P.C.

(57) ABSTRACT

In a mirror housing integrally formed with a stay fixed to a vehicle, a tilting mechanism for tilting a prism mirror is formed by a horizontal bearing, full reflection position engaging grooves and partial reflection position engaging grooves formed on the inside surface of the mirror housing and a plate spring and, head light from a vehicle running in the rear can thereby be dimmed. A mirror surface adjusting mechanism for the prism mirror is formed by a support, a plate pivot and a cap support and a driver can adjust the prism mirror to a position where he can easily watch the prism mirror.

9 Claims, 5 Drawing Sheets

REARVIEW MIRROR

BACKGROUND OF THE INVENTION

This invention relates to an interior mirror for a vehicle having a dimming function performed by a prism mirror.

In a prior art dimming rearview mirror mounted on the inside of a vehicle, as shown in FIGS. 3A and 3B, a mirror housing 22 to which a prism mirror 21 is fixedly fitted is pivotably connected to a stay 24 which is mounted on a front window 23 through fitting of a pivot 24a provided on the stay 24 to a pivot bearing 22a provided on the mirror housing 22. By sliding movement of the pivot 24a relative to the pivot bearing 22a, the driver can adjust the mirror surface of the prism mirror 21 to a position in which the driver can easily watch the mirror surface. The prism mirror 21 can be switched between a full reflection position and a partial reflection position to dim head light of a vehicle running in the rear by operating a tilting unit 26 with a reflectivity switching lever 25 located in the lower portion of the mirror housing 22 and thereby pivoting the mirror housing 22 by a predetermined angle. FIG. 3A shows a full reflection state during the day and FIG. 3B shows a partial reflection state during the night.

It is an object of the present invention to provide a prism mirror type rearview mirror which realizes switching between full reflection and partial reflection and adjustment of the mirror surface angle with a novel structure which is different from the structure of the prior art rearview mirror.

SUMMARY OF THE INVENTION

According to the invention, there is provided a rearview mirror for a vehicle comprising a prism mirror, a mirror surface adjusting unit, a prism angle switching unit and a mirror housing enclosing them, the prism angle switching unit being mounted in the mirror housing and the mirror surface adjusting unit being connected, on one hand, to the prism angle switching unit and holding the prism mirror on the other hand, the prism angle switching unit being capable of pivoting the prism mirror with the mirror surface adjusting unit and thereby switching incident light to the prism mirror between a position in which the incident light is fully reflected and a position in which the incident light is partially reflected, the mirror surface adjusting unit being capable of pivoting the mirror surface vertically and laterally, separately from the prism angle switching unit, and thereby adjusting the angle of the mirror surface, and the mirror housing being supported on the vehicle.

More specifically, in one aspect of the invention, the prism mirror angle switching unit is formed with a convex or concave surface and the mirror surface adjusting unit is formed with a concave or convex surface which fits the convex or concave surface of the mirror angle switching unit. The angle of the mirror surface of the prism mirror held by the mirror surface adjusting unit can be adjusted with a simple structure by fitting of the convex or concave surface of the prism mirror angle switching unit to the concave or convex surface of the mirror surface adjusting unit.

In another aspect of the invention, a part of the mirror surface adjusting unit extends to form a mirror surface adjusting operator means and the mirror housing has an opening formed therein through which the mirror surface adjusting operator means projects outwardly. By operating the mirror surface adjusting operator means, the mirror surface angle can be adjusted without directly touching the mirror surface with the driver's hand and, therefore, a clear view can be provided without soiling the mirror surface with the driver's hand.

In another aspect of the invention, the prism angle switching unit has a horizontal shaft and is mounted pivotably to the mirror housing by means of the horizontal shaft. By this arrangement, s simple structure can be realized.

In another aspect of the invention, a part of the prism angle switching unit extends to form a prism angle switching operator means and the mirror housing is formed with an opening through which the prism angle switching operating means projects outwardly. By operating the prism angle switching operator means, the prism mirror can be pivoted by a predetermined angle without directly touching the mirror surface with the driver's hand and, therefore, a clear view can be provided without soiling the mirror surface with the driver's hand.

In another aspect of the invention, a mirror surface adjusting operator means which is formed by extending a part of the mirror surface adjusting unit and projects outwardly through an opening formed in the mirror housing is disposed in a position which is different from a position of a prism angle switching operating means which is formed by extending a part of the prism angle switching unit and projects outwardly through an opening formed in the mirror housing. By this arrangement, interference between the two operator means can be prevented and the adjusting operations thereby can be facilitated.

In another aspect of the invention, the rearview mirror further comprises a ring which covers a peripheral portion of an opening portion of the mirror housing. By this arrangement, visuality can be improved by concealing a portion along the entire periphery of the prism mirror in which distortion tends to be produced. Besides, since gap between the mirror housing and the prism mirror is concealed, appearance of the rearview mirror as a whole is improved.

In another aspect of the invention, the rearview mirror further comprises a support member for mounting the mirror housing to a main body of the vehicle, said support member being formed integrally with the mirror housing. By this arrangement, the adjustment of the mirror surface is made without employing the pivotal sliding movement between the stay and the mirror housing as in the prior art rearview mirror and, therefore, the stay and the mirror housing can be made integral whereby the number of the component parts can be reduced and the weight of the rearview mirror can be also reduced.

If, in the above described prior art rearview mirror in which the prism mirror is fitted to the opening portion of the mirror housing, the prism mirror was made of synthetic resin, distortion of an image would be produced due to deformation of the prism mirror made of synthetic resin which would be compressed by the mirror housing. In the rearview mirror of the invention, the prism mirror is not fixedly fitted to the mirror housing and, therefore, the prism mirror is not subject to the compressive force exerted by the mirror housing. Accordingly, no distortion in an image takes place though the prism mirror even if the prism mirror is made of synthetic resin. By employing synthetic resin, the weight and manufacturing cost of the rearview mirror can be reduced as compared with a rearview mirror made of glass.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1A:
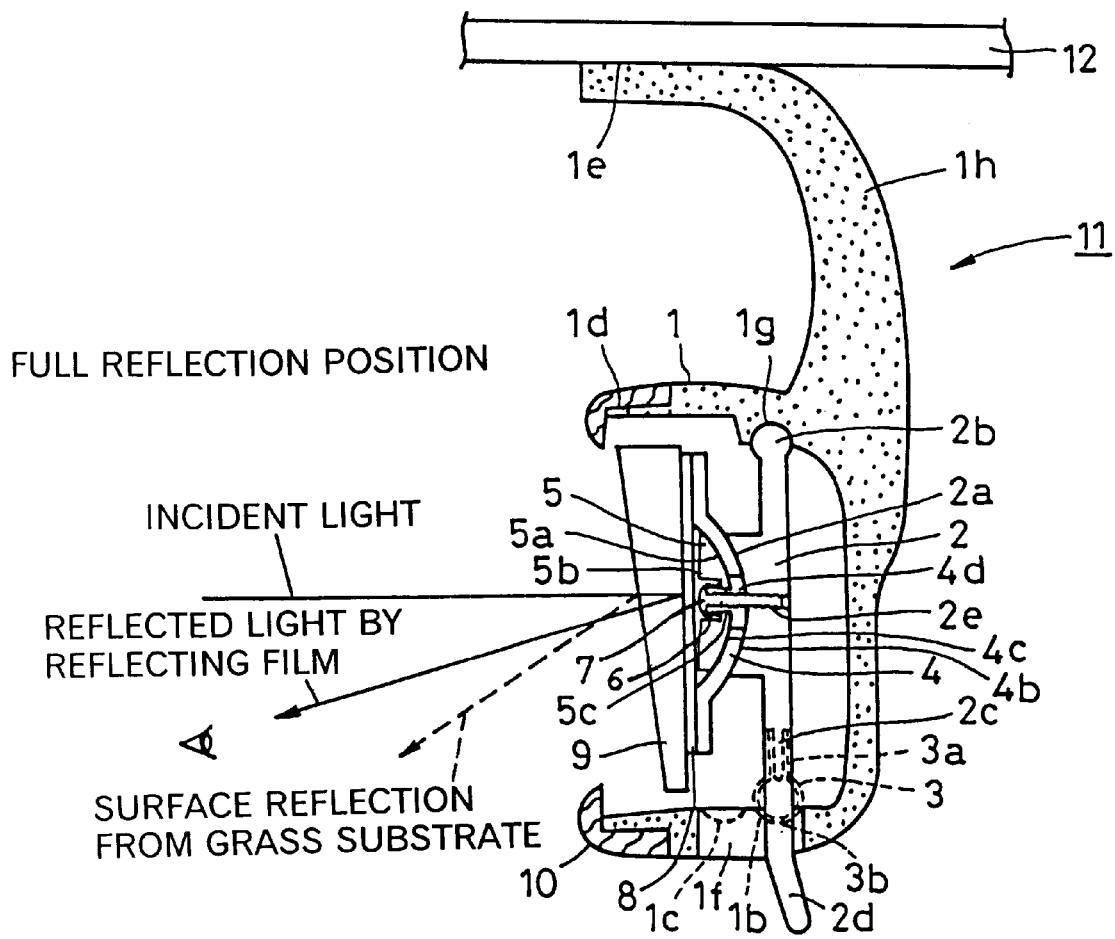
FIGS. 1A and 1B are vertical sectional views of an embodiment of the rearview mirror made according to the invention.
Figure 1B:
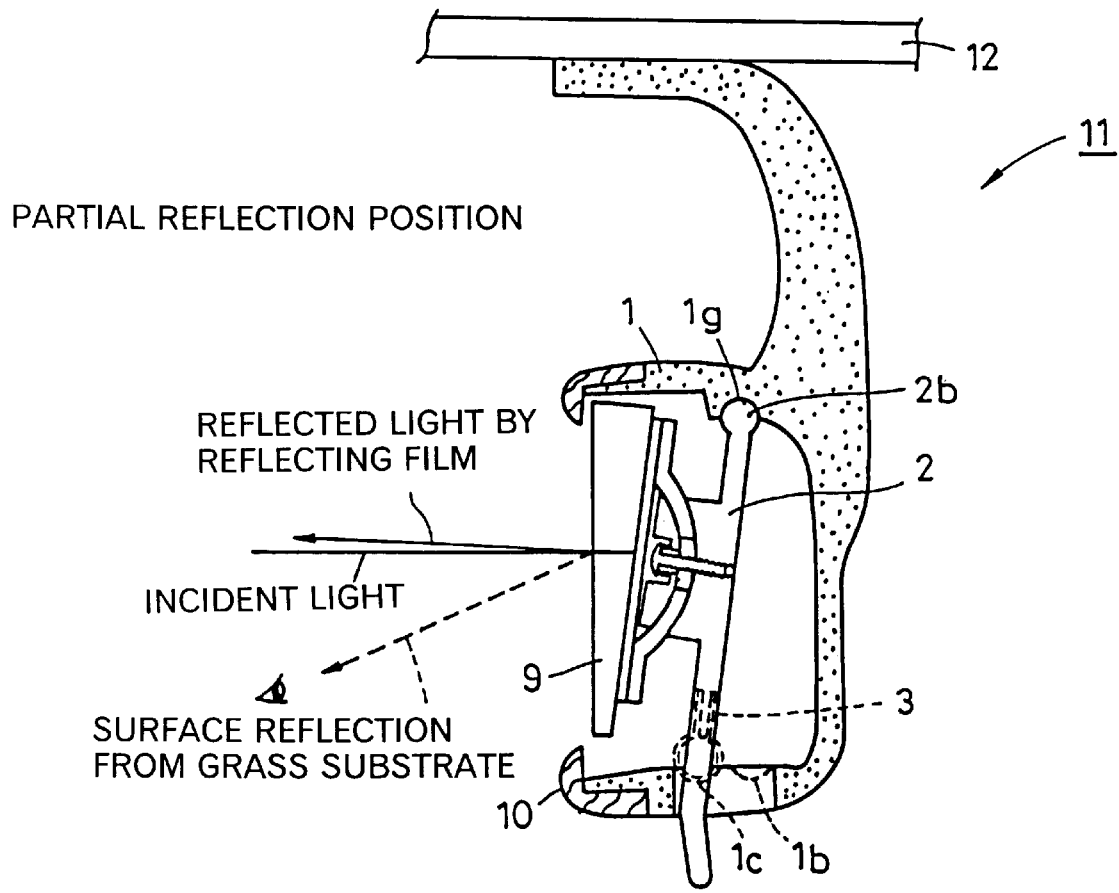
Figure 2:
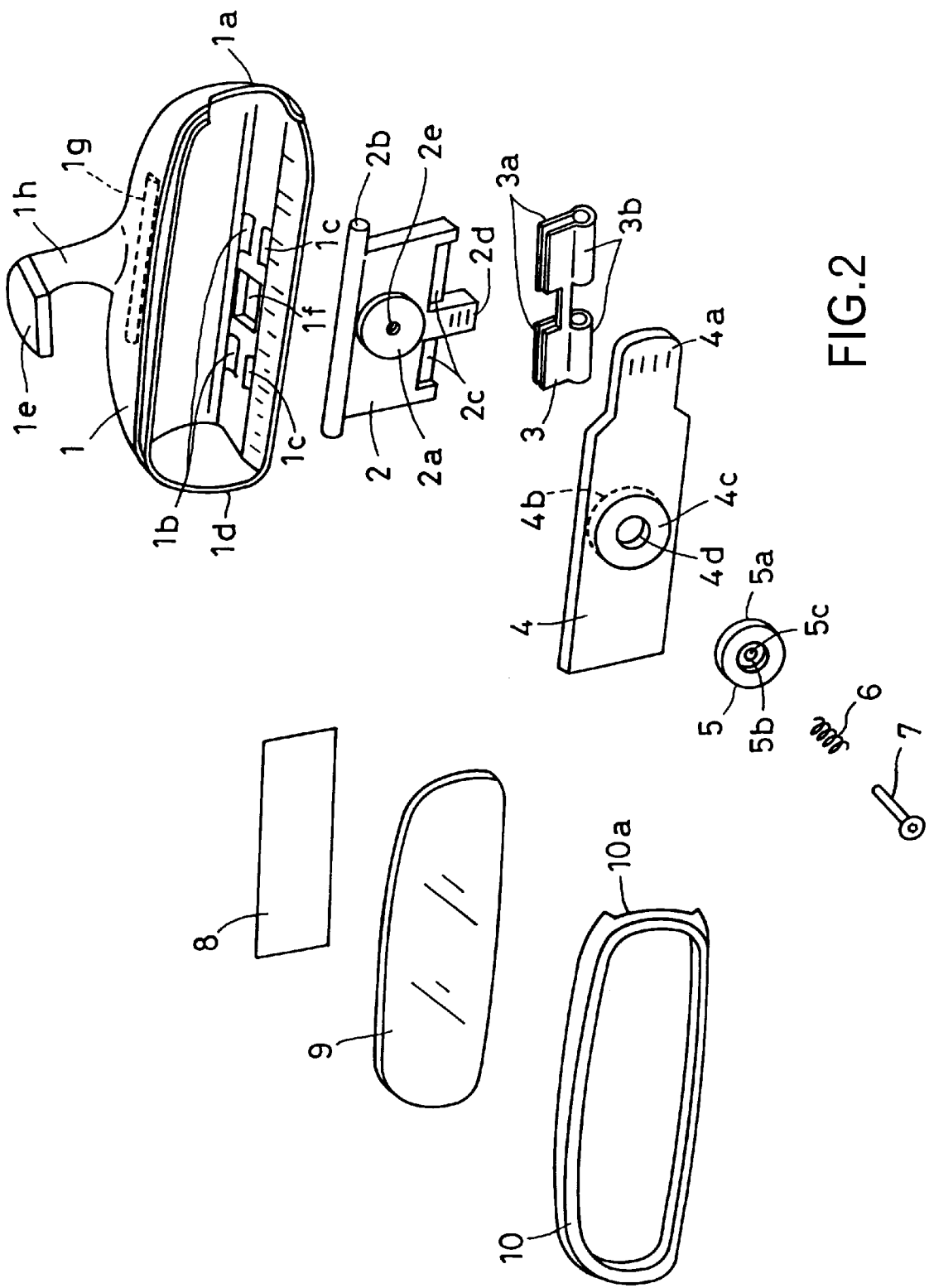
FIG. 2 is a perspective exploded view showing component parts of a mirror main body 11 of FIGS. 1A and 1B.
Figure 3A:
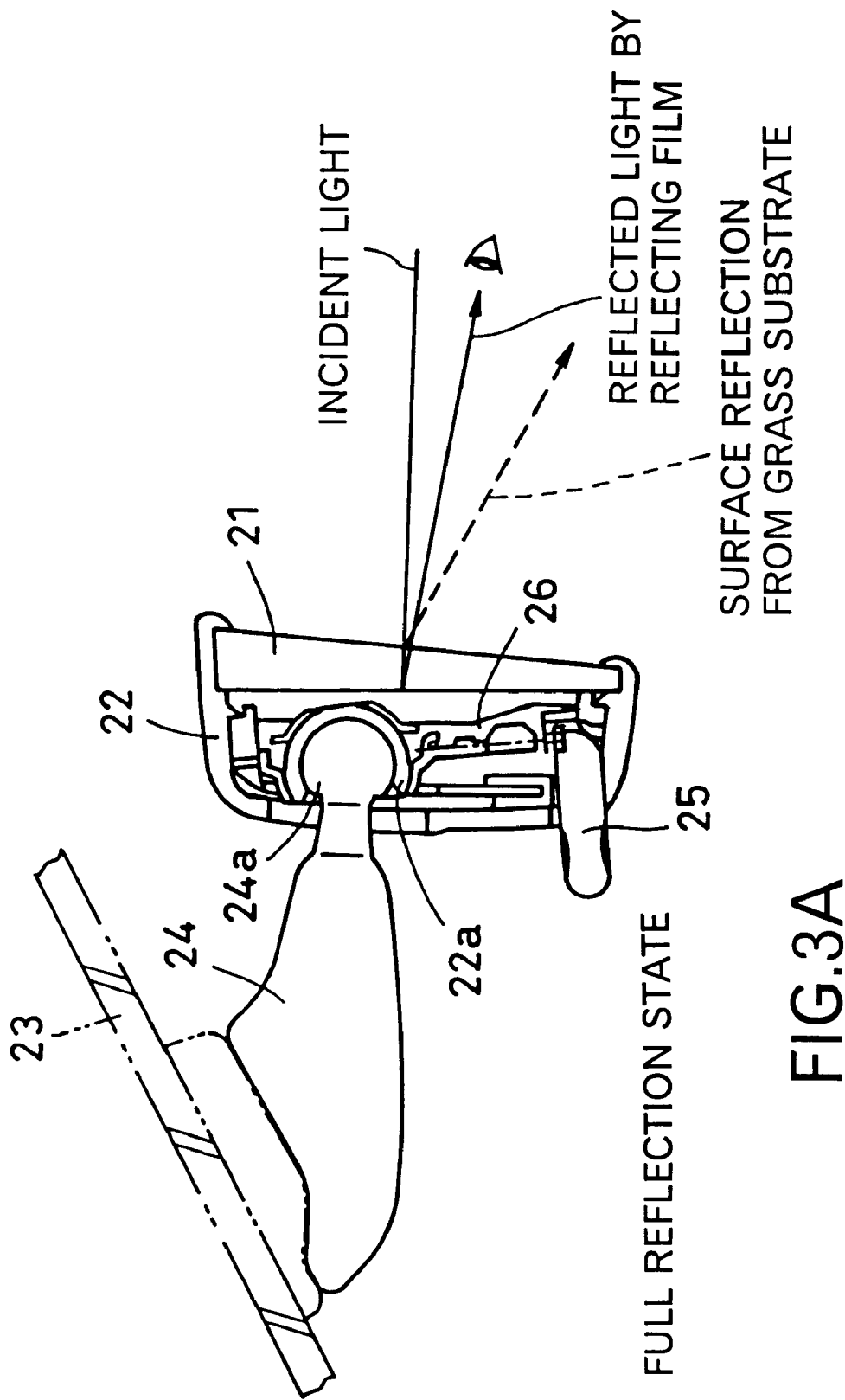
FIGS. 3A and 3B are vertical sections of the prior art dimming rearview mirror.
Figure 3B:
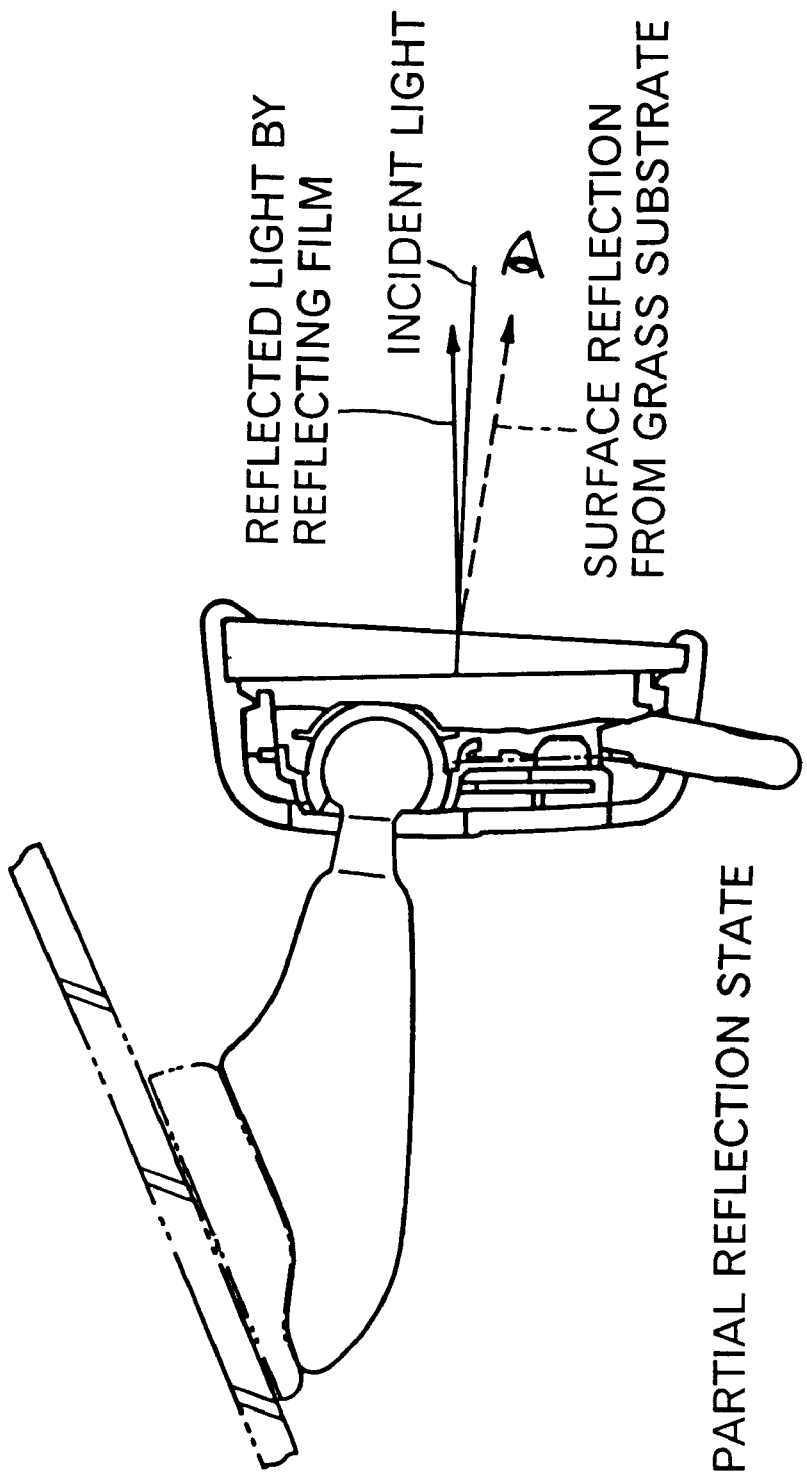

In FIGS. 1A and 1B which illustrate an embodiment of the rearview mirror according to the invention, FIG. 1A shows a state in which the prism angle is in a full reflection position and FIG. 1B shows a state in which the prism angle is in a partial reflection position. Components of the rearview mirror are shown in FIG. 2.

In FIGS. 1A and 1B, a prism type dimming interior mirror 11 has a mounting portion 1e which extends upwardly from the upper portion in the central portion of a mirror housing 1 as viewed in the width direction of the mirror housing 1 and is fixed in this mounting portion 1e to a ceiling 12 of a vehicle by means of fastening means such as a screw.

The structure of the mirror housing 1 will now be described. The mirror housing 1 is made of synthetic resin and a stay portion 1h and the mounting portion 1e of the mirror housing 1 are formed integrally.

On the inside upper surface of the mirror housing 1 is formed a horizontal bearing 1g which has an arcuate cross section and extends in the direction of width of the mirror housing 1 in parallel with an opening portion 1d of the mirror housing.

The mirror housing 1 is formed in the central portion of the lower portion thereof with an opening 1f having a width which is sufficient for allowing insertion of a reflectivity switching lever 2d of a support 2 to be described later and a depth which will not interfere with an operation for switching the reflectivity of a prism mirror 9 to be described later. On both sides of the opening 1f in the longitudinal direction of the mirror housing 1 are formed grooves 1c and 1b of an arcuate cross section arranged in two rows in the lateral direction of the mirror housing 1 for switching and fixing the reflectivity of the prism mirror 9. The inside grooves 1b are engaging grooves for the full reflection position and the outside grooves 1c are engaging grooves for the partial reflection position.

The mirror housing 1 is formed in one side portion of the opening portion 1d (in the present embodiment, the end portion on the driver's side in the longitudinal direction of the mirror housing 1) with an opening 1a through which a mirror surface adjusting lever 4a of a plate pivot 4 to be described later projects outwardly. The opening 1a of the mirror housing 1 has the same circumferential length as the circumferential length of an opening 10a of a ring 10 to be described later so that when the mirror surface adjusting lever 4a of the plate pivot 4 is operated for mirror surface adjustment within a maximum necessary range, the mirror surface adjusting lever 4a of the plate pivot 4 will not interfere with the mirror housing 1 and the ring 10.

The support 2 is made of, e.g., synthetic resin in the form of a generally rectangular plate and formed in the upper portion thereof with a horizontal shaft 2b in the form of a round bar which fits in the horizontal bearing 1g of the mirror housing 1. The support 2 is also formed in the lower central portion thereof with the reflectivity switching lever 2d which extends downwardly and, on both sides of the lever 2d are formed with a pair of portions 2c of a reduced thickness which fits in a pair of clamping portions 3a of a plate spring 3 to be described later. The support 2 is also formed in the central portion of its surface on the rear side of the vehicle with a pivot concave 2a. The pivot concave 2a is formed in its central portion with a screw hole 2e in which a screw 7 to be described is engaged.

The plate spring 3 is made of a thin plate of metal or synthetic resin. The thin plate is folded midway with a width equal to the thickness of the support 2. The two free end upper portions of the thin plate constitute the clamping portion 3a for clamping the reduced-thickness portions 2c of the support 2 and the folded lower portions constitute rounded bent portions 3b of a circular cross section which elastically engage in the full reflection position engaging grooves 1b or the partial reflection position engaging grooves 1c of the mirror housing 1.

Mounting of the support 2 and the plate spring 3 on the mirror housing 1 will now be described. First the reduced-thickness portions 2c of the support 2 are fitted to the clamping portions 3a of the plate spring 3. The reflectivity switching lever 2d of the support 2 is inserted through the opening 1f of the mirror housing 1, the bent portions 3b of the plate spring 3 are fixed to the full reflection position engaging grooves 1b or the partial reflection position engaging grooves 1c of the mirror housing 1, and the horizontal shaft 2b of the support 2 is pivotably mounted on the horizontal bearing 1g of the mirror housing 1 by bending the bent portions 3b of the plate spring 3. By this arrangement, the reflectivity of the prism mirror 9 to be described later can be switched by pivoting of the support 2.

The plate pivot 4 is formed, in the central portion of its surface on the front side of the vehicle where the support 2 is disposed, with a pivot convex 4b which fits the pivot concave 2a of the support 2. The pivot convex 4b is formed on the rear side thereof with a cap support receiving portion 4c of a concave shape in which a cap portion 5a of a cap support 5 to be described is received. The pivot convex 4b and the cap support receiving portion 4c of the plate pivot 4 are formed in their central portions with a screw insertion aperture 4d through which the screw 7 to be described later is inserted. The plate pivot 4 has a portion which extends toward the driver's side and this extended portion constitutes the mirror surface adjusting lever 4a.

The cap support 5 has the cap portion 5a of a convex shape on the front side of the vehicle where the plate pivot 4 is disposed. The cap portion 5a is formed on the rear surface thereof with a spring seat 5b for receiving a coil spring 6 to be described later. The cap portion 5a is formed in its central portion with a screw insertion aperture 5c through which the screw 7 to be described is inserted.

Mounting of the plate pivot 4 on the support 2 will now be described. The pivot convex 4b of the plate pivot 4 is fitted in the pivot concave 2a of the support 2, the cap portion 5a of the cap support 5 is received in the cap support receiving portion 4c on the rear side of the pivot convex 4b of the plate pivot 4, the coil spring 6 is received on the spring seat 5b of the cap support 5, the screw 7 is inserted through the coil spring 6, the screw insertion aperture 5c of the cap support 5 and the screw insertion aperture 4d of the plate pivot 4, and is fixed in threaded engagement to the screw hole 2e of the support 2 whereby the plate pivot 4 is pivotably mounted on the support 2 which is fixed to the mirror housing 1.

The prism mirror 9 is adhered to the surface of the plate pivot 4 on the rear side of the vehicle by means of a double-coated tape 8. By operating the mirror surface adjusting lever 4a of the plate pivot 4, the driver can pivot and adjust the prism mirror 9 to a position where the driver can easily watch the prism mirror 9. The mirror surface adjusting lever 4a of the plate pivot 4 projects out of a combination opening of the opening 1a of the mirror housing 1 and the ring opening 10a of the ring 10 to be described later and, by operating this lever 4a, the driver can adjust the visual angle without touching the mirror surface.

The ring 10 is mounted on the opening portion 1d of the mirror housing 1 and thereby covers and conceals the peripheral portion of the opening portion 1d. By this arrangement, a portion in the entire periphery on the mirror side of the prism mirror 9 where distortion tends to be produced is concealed. The ring 10 is disposed in such a manner that it will not contact the prism mirror 9 and will not interfere with the operation for adjusting the mirror surface of the prism mirror 9. The opening 10a of the ring 10 has the same circumferential length as the circumferential length of the opening 1a of the mirror housing 1 so that when the mirror surface adjusting lever 4a of the plate pivot 4 is operated for mirror adjustment within a maximum necessary range, the mirror surface adjusting lever 4a of the plate pivot 4 will not interfere with the mirror housing 1 and the ring 10.

In the above described embodiment, the pivot concave 2a is formed in the support 2 and the pivot convex 4b is formed in the plate pivot 4. Conversely, a pivot convex may be formed in the support 2 and a pivot concave may be formed in the plate pivot 4.

What is claimed is:

1. A rearview mirror for a vehicle comprising a prism mirror, a mirror surface adjusting unit, a prism angle switching unit and a mirror housing enclosing them, the prism angle switching unit being mounted in the mirror housing and the mirror surface adjusting unit being connected, on one hand, to the prism angle switching unit and holding the prism mirror on the other hand, the prism angle switching unit being capable of pivoting the prism mirror with the mirror surface adjusting unit and thereby switching incident light to the prism mirror between a position in which the incident light is fully reflected and a position in which the incident light is partially reflected, the mirror surface adjusting unit being capable of pivoting the mirror surface vertically and laterally, separately from the prism angle switching unit, and thereby adjusting the angle of the mirror surface, and the mirror housing being supported on the vehicle.

2. A rearview mirror for a vehicle as defined in claim 1 wherein the prism mirror angle switching unit is formed with a convex or concave surface and the mirror surface adjusting unit is formed with a concave or convex surface which fits the convex or concave surface of the mirror angle switching unit and the angle of the mirror surface of the prism mirror held by the mirror surface adjusting unit can be adjusted by fitting of the convex or concave surface of the prism mirror angle switching unit to the concave or convex surface of the mirror surface adjusting unit.

3. A rearview mirror as defined in claim 1 wherein a part of the mirror surface adjusting unit extends to form a mirror surface adjusting operator means and the mirror housing has an opening formed therein through which the mirror surface adjusting operator means projects outwardly.

4. A rearview mirror for a vehicle as defined in claim 1 wherein the prism angle switching unit has a horizontal shaft and is mounted pivotably to the mirror housing by means of the horizontal shaft.

5. A rearview mirror for a vehicle as defined in claim 1 wherein a part of the prism angle switching unit extends to form a prism angle switching operator means and the mirror housing is formed with an opening through which the prism angle switching operating means projects outwardly.

6. A rearview mirror for a vehicle as defined in claim 1 wherein a mirror surface adjusting operator means which is formed by extending a part of the mirror surface adjusting unit and projects outwardly through an opening formed in the mirror housing is disposed in a position which is different from a position of a prism angle switching operating means which is formed by extending a part of the prism angle switching unit and projects outwardly through an opening formed in the mirror housing.

7. A rearview mirror for a vehicle as defined in claim 1 which further comprises a ring which covers a peripheral portion of an opening portion of the mirror housing.

8. A rearview mirror for a vehicle as defined in claim 1 which further comprises a support member for mounting the mirror housing to a main body of the vehicle, said support member being formed integrally with the mirror housing.

9. A rearview mirror for a vehicle as defined in claim 1 wherein the prism mirror is made of synthetic resin.

* * * * *